United States Patent [19]
Wong

[11] Patent Number: 5,365,205
[45] Date of Patent: Nov. 15, 1994

[54] BACKPLANE DATABUS UTILIZING DIRECTIONAL COUPLERS

[75] Inventor: Larry K. Wong, Kanata, Canada

[73] Assignee: Northern Telecom Limited, Montreal, Canada

[21] Appl. No.: 64,282

[22] Filed: May 20, 1993

[51] Int. Cl.$^5$ .............................................. H01D 5/18
[52] U.S. Cl. ..................................... 333/109; 333/116
[58] Field of Search ...................... 333/109, 116; 375/7

[56] References Cited

U.S. PATENT DOCUMENTS

| | | | |
|---|---|---|---|
| 3,619,504 | 11/1971 | Olney et al. | 178/68 |
| 3,863,024 | 1/1975 | Caragliano et al. | 178/68 |
| 4,029,902 | 6/1977 | Bell, Jr. et al. | 179/15 FD |

Primary Examiner—Robert J. Pascal
Assistant Examiner—Darius Gambino
Attorney, Agent, or Firm—Dallas F. Smith

[57] ABSTRACT

A backplane databus and bussing method provide multi-drop signal distribution using capacitive and inductive coupling of a main signal. A main signal loop on the backplane has a plurality of coupling loops coupled thereto for a respective length $L_C$. The main signal, typically a NRZ trapezoidal shaped waveform is coupled into the coupling loops as a bipolar signal. The main signal loop is terminated by a resistor having a resistance equal to the characteristic impedance of the track forming the main signal loop. Similarly, the coupling loops are terminated at a far end by resistors whose impedance is equal to the characteristic of the track forming the coupling loop. The near end of the loop is connected to a receiver having a matching input impedance.

5 Claims, 2 Drawing Sheets

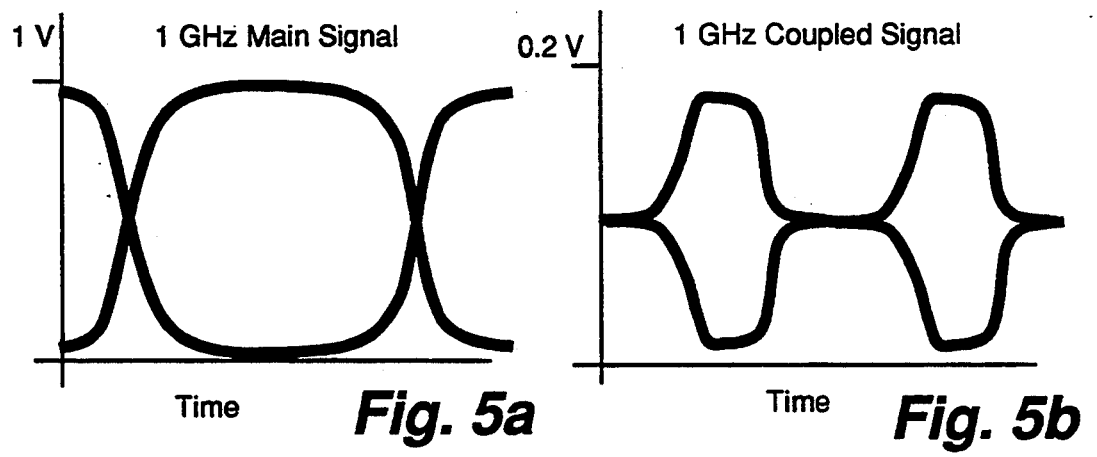
Fig. 5a
Fig. 5b
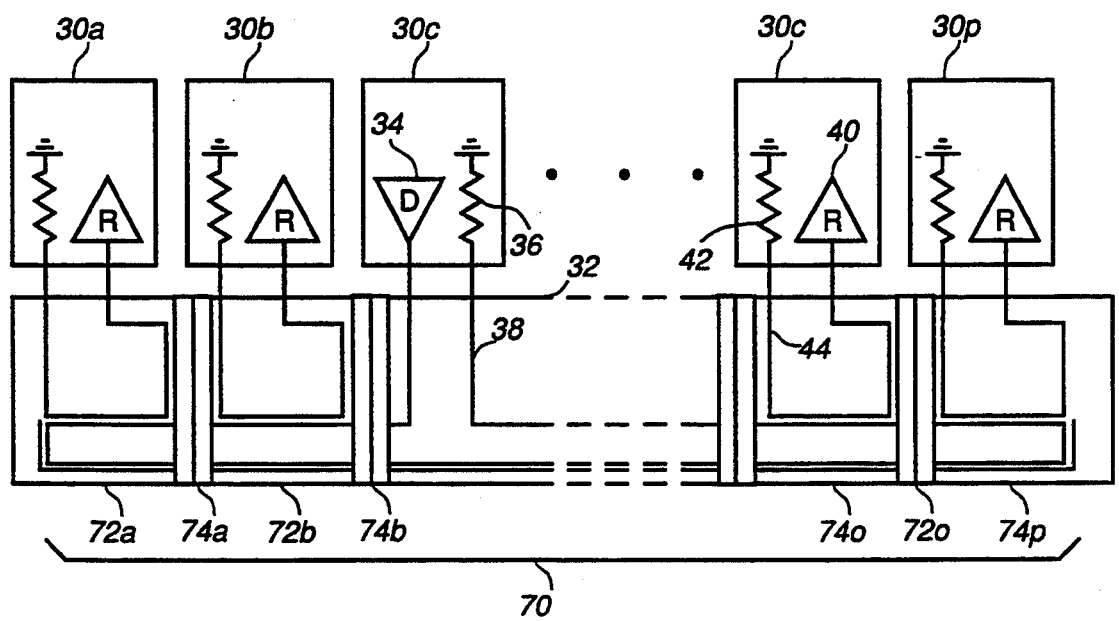
Fig. 6
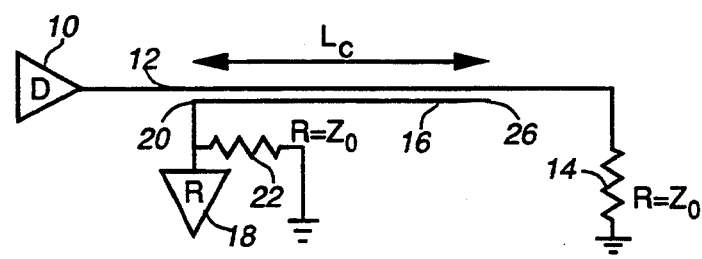
Fig. 7

5,365,205

BACKPLANE DATABUS UTILIZING DIRECTIONAL COUPLERS

This invention relates to backplane databusses.

BACKGROUND TO THE INVENTION

Advances in microprocessor technology continue to push operating speeds higher. These higher speeds both allow and mandate correspondingly higher transmission rates. As transmission rates increase toward the gigabit per second rate, several well-known phenomena become problematic. One is the generation of electromagnetic interference (EMI) at physical interfaces, for example connectors. This problem is of increasing concern as regulatory agencies draft and impose rules limiting the level of allowable emission. In typical equipment shelves with multiple plug-in circuit boards edge-connected to a backplane, limiting emissions from connectors is nontrivial. In multi-drop bussing schemes impedance mismatching may further exacerbate the EMI problem.

SUMMARY OF THE INVENTION

An object of the present invention is to provide an improved backplane databus.

In accordance with an aspect of the present invention there is provided in a backplane databus comprising a first conductive track having a first end and a second end, the second end terminated by an impedance substantially equivalent to a characteristic impedance of the first conductive track, and a second conductive track having a first end adjacent the first end of the first conductive track and a second end, the second end terminated by an impedance substantially equivalent to a characteristic impedance of the second conductive track, the second conductive track having a portion lying substantially parallel to the first conductive track for a coupling length $L_c$, a method of bussing a main signal comprising the steps of: driving the main signal onto the first conductive track at the first end thereof; and receiving a signal coupled onto the second conductive track at the first end thereof.

In accordance with another aspect of the present invention there is provided a backplane databus comprising: a first conductive track forming an elongate rectangle and having a first end for input from a signal driver and a second end for termination by a predetermined resistance; a plurality of second conductive tracks each having a first end, adjacent the first end of the first conductor, for output to a receiver and a second end for termination by a predetermined resistance; and a portion of the second conductive track lying substantially parallel to the first for a coupling length $L_c$.

Advantages of the present invention are: support for very high frequency data transmission, ability to accommodate as many drops as physically allowed, supports both single-ended and differential transmission, offers a lower level of EMI emission, may be implemented using low cost printer circuit board technology.

BRIEF DESCRIPTION OF THE DRAWINGS

The present invention will be further understood from the following description with reference to the drawings in which:

FIGS. 5a and 5b graphically illustrate 1 GHz signals typical of the multi-drop bus of FIG. 3;

FIG. 6 illustrates a multi-drop databus in accordance with a further embodiment of the present invention; and FIG. 7 illustrates a single-drop databus in accordance with an additional embodiment of the present invention.

Similar references are used in different figures to denote similar components.

Detailed Description

Figure 1:
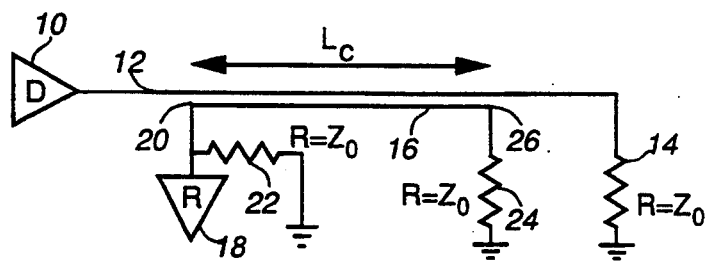
FIG. 1 illustrates a single-drop databus in accordance with one embodiment of the present invention.

Referring to FIG. 1, there is illustrated a single-drop databus in accordance with one embodiment of the present invention. The single-drop databus includes a data driver 10 connected to a track 12 terminated with a resistor 14 to ground. The single-drop databus also includes a second track 16, which lies parallel to the track 12 for a coupling length Lc. The track 16 is connected to a data receiver 18 at an end 20 near to the driver 10 and is terminated by resistor 22 at the near end 20 and a resistor 24 at a far end 26. Resistors 14, 22, and 24 have a value $R=Z_0$, where $Z_0$ is the characteristic impedance of each respective track.

Figure 2:
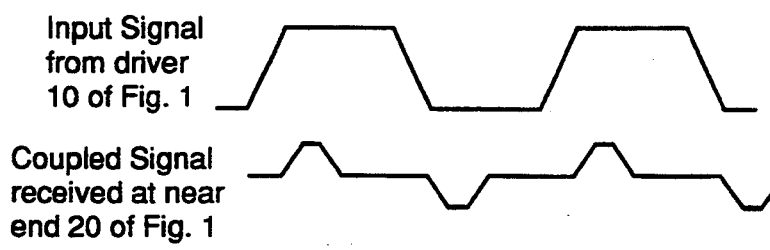
FIG. 2 graphically illustrates waveforms representative of signals typical of the single-drop databus of FIG. 1.

In operation, a NRZ data signal driven onto the track 12 by the data driver 10 is coupled both inductively and capacitively onto the second track 16. In FIG. 2, a typical trapezoidal NRZ input signal (a) and a typical coupled signal (b) are illustrated. The coupled signal (b) is received at the near end 20 of track 16. The exact shape of the coupled signal is dependent upon the coupling length $L_c$ and the characteristics of the input signal, that is the voltage, $V_0$, the rise time, $t_r$, and the fall time $t_f$. The data receiver 18 is a differential comparator that recovers the NRZ data by comparing the positive and negative pulses to ground. An example of a suitable comparator is the MC1652 by Motorola.

Figure 3:
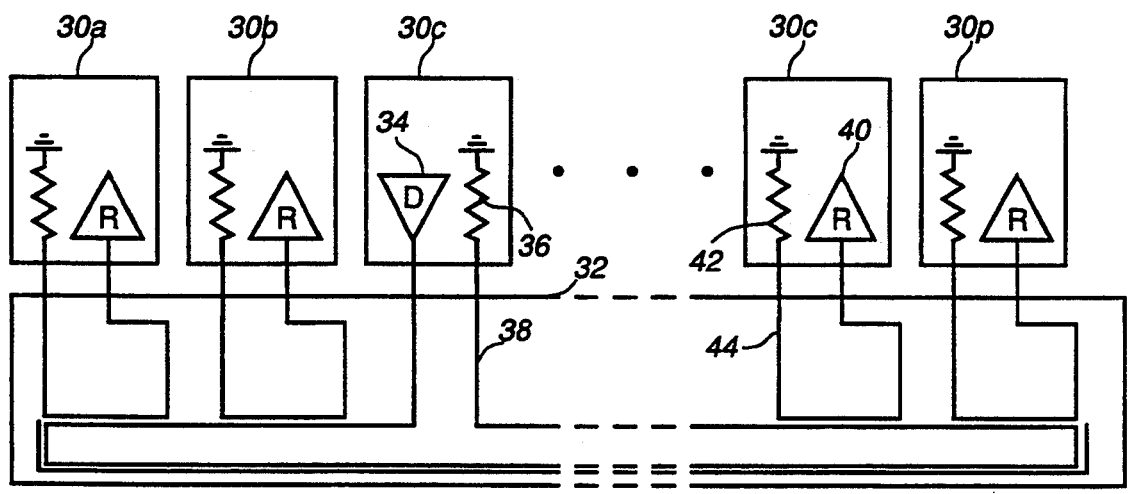
FIG. 3 illustrates a multi-drop databus in accordance with another embodiment of the present invention.

Referring to FIG. 3, there is illustrated a multi-drop databus in accordance with another embodiment of the present invention. The multidrop databus includes a plurality of circuit cards 30a through 30p and a backplane 32. One circuit card 30c includes a driver 34 and a termination resistor 36 connected to a conductive loop 38. Other cards 30a, 30b, 30d, ..., 30o, and 30p include receivers 40a, 40b, 40d, ..., 40o, and 40p and termination resistors 42a, 42b, 42d, ..., 42o, and 42p, respectively, connected to respective conductive loops 44a, 44b, 44d, ..., 44o, and 44p. The loop 38 is routed to form an elongate rectangle on the backplane 32. The loops 44 each have a substantially linear portion 46 lying parallel to the loop 38 for a coupling length $L_c$. The loop 38 and loops 44 on the backplane are formed by known printed circuit board technology and may be either microstrips or striplines. The loop 38 has its geometry adjusted to compensate for the presence of loops 44 to maintain a desired characteristic impedance, for example 50 ohms. All cards are connected to the loops of the backplane 32 using known connectors.

In operation, the driver 32 of circuit card 30c transmits a main signal on the loop 38 of the type represented by input signal (a) of FIG. 2. The main signal in traversing the loop 38 passes loops 44b, 44a, 44p, 44o, ..., and 44d before terminating back on the card 30c in the termination resistor 36. As the main signal passes loops 44, a coupled signal, of the type represented by coupled signal (b) of FIG. 2, is induced in the card loop 44 as received from a near end thereof by the respective receiver 40.

Figure 4:
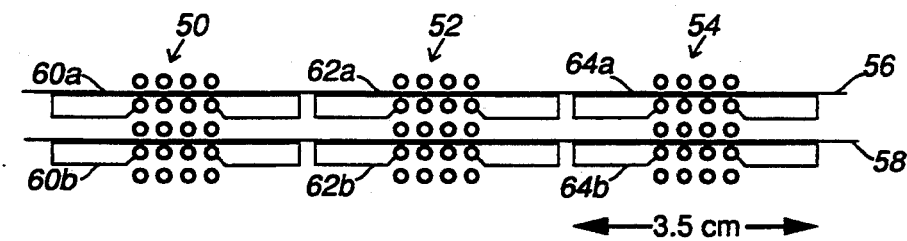
FIG. 4 schematically illustrates a portion of backplane in accordance with a particular embodiment of the present invention.

In FIG. 4, a portion of backplane is schematically illustrated in accordance with a particular embodiment of the present invention. The portion of the backplane includes three sets of connector pins 50, 52 and 54, two main signal tracks 56 and 58, and card loops 60a, 60b, 62a, 62b, 64a, and 64b. One set of connector pins 50 and card loops 60a and 60b correspond to one circuit card 30l (not shown in FIG. 4). The other sets of connector pins 52 and 54, and card loops 62a, 62b and 64a, 64b correspond to adjacent circuit cards 30m and n (not shown in FIG. 4). The particular embodiment of FIG. 4 provides a coupling length of 3.5 cm and a slightly larger backplane connector spacing.

Referring to FIGS. 5a and 5b, there are graphically illustrated typical 1 GHz signals on the multidrop bus of FIG. 3. The signal of FIG. 5a represents a typical measured 1 GHz main signal and the signal of FIG. 5b represents a typical 1 GHz coupled signal. Note from both FIG. 2 and FIG. 5b that the coupled signal is bipolar in nature and resembles an AMI (Alternate Marking Inversion) signal. Due to the lower energy content, the spectrum of the coupled signal is lower than the main signal. Thus the multidrop bus of FIG. 3 in connecting the coupled signal to each card, rather than the driven signal, lowers the electromagnetic interference (EMI) emissions at the connectors. As connectors are a major source of such emissions, this represents a significant improvement.

Referring to FIG. 6, there is illustrated a multidrop bus in accordance with a further embodiment of the present invention. The multidrop bus of FIG. 6 differs from that of FIG. 3 in having a modular backplane 70. Modules 72a–72p of the modular backplane 70 are joined together using connectors 74a–74o. This is possible because each multidrop main signal uses only a single loop as opposed to one lead for each in a point to point configuration. Also, the attenuation of the main signal due to the length of the main signal loop, tends to smooth the signal and, therefore, reduce the effect of distortions introduced by the connectors 74a–74o. Due to the insensitivity of the coupled signal to distortions in the main signal, any remaining distortions are not present in the coupled signal.

In FIG. 7, a single drop bus is illustrated for the case of a stripline tracks. If all of the circuit tracks involved in the bus structure are buried tracks to form striplines, the coupled signal line 16 does not require far end termination by the resistor 24 as in FIG. 1. This has the practical advantage of saving a termination resistor and a pin per connector coupling the circuits cards to the backplane.

Numerous modifications, variations and adaptations may be made to the particular embodiments of the invention described above without departing from the scope of the invention, which is defined in the claims.

What is claimed is:

1. A backplane databus comprising:

a plurality of modules, each having first, second and third edges, first and second substantially parallel conductive tracks between the first and second edges for carrying a main signal, a third conductive track forming a loop running from the third edge, paralleling the first substantially parallel conductive track for a coupling length $L_c$ and returning to the third edge, and first, second and third connectors affixed to the first, second, and third edges respectively, the first and second connectors electrically connected to respective ends of the first and second substantially parallel conductive tracks, the third connector electrically connected to the third conductive track;

a pair of end modules, each having fourth and fifth edges, a fourth conductive track forming a u-shape from the fourth edge back to the fourth edge, a fifth conductive track forming a loop running from the fifth edge, paralleling the fourth conductive track for a coupling length $L_c$ and returning to the fifth edge and fourth and fifth connectors affixed to the fourth and fifth edges respectively, the fourth connector electrically connected to the fourth conductive track, the fifth connector electrically connected to the fifth conductive track; and an intermediate module having sixth, seventh and eighth edges, sixth, seventh, and eighth conductive tracks, the sixth and seventh conductive tracks each forming an L-shape from the eighth edge to the sixth and seventh edges, respectively, an eight conductive track between the sixth and seventh edges and sixth, seventh and eighth connectors affixed to the sixth, seventh and eighth edges, respectively, and electrically connected to the sixth and eighth conductive tracks, and seventh and eighth conductive tracks and sixth and seventh conductive tracks, respectively, the intermediate, plurality and end modules being interconnected thereby to form a continuous main conductive track including the sixth conductive track, a portion of the plurality of first conductive tracks, a fourth conductive track, a like portion of the plurality of second conductive tracks, the eighth conductive track, the remainder of the plurality of second conductive tracks, a fourth conductive track, the remainder of the plurality of first conductive tracks, and the seventh conductive track.

2. A backplane databus as claimed in claim 1 wherein the plurality of modules are formed on the printed circuit board.

3. A backplane databus as claimed in claim 2 wherein the printed circuit board includes pads for connection to the pins of the connectors.

4. A backplane databus as claimed in claim 3 wherein the first conductive track lies between the pads for each connector for the plurality of circuit cards.

5. A backplane databus as claimed in claim 4 wherein the third conductive track parallels the first conductive track between the pads for each connector for the plurality of circuit cards and loops away from the first conductive track and back to respective pads at each end of the third conductive track.

* * * * *